United States Patent [19]
Ogino et al.

[11] Patent Number: 5,153,082
[45] Date of Patent: Oct. 6, 1992

[54] NONAQUEOUS ELECTROLYTE SECONDARY BATTERY

[75] Inventors: Takao Ogino, Tokorozawa; Tadaaki Miyazaki, Higashiyamato; Masao Ogawa, Kawagoe; Yuko Maeda, Akishima; Shigeru Kijima, Tokorozawa; Koji Takagi, Kodaira; Takahiro Kawagoe, Tokorozawa, all of Japan

[73] Assignee: Bridgestone Corporation, Tokyo, Japan

[21] Appl. No.: 748,840

[22] Filed: Aug. 23, 1991

[30] Foreign Application Priority Data

| Sep. 4, 1990 | [JP] | Japan | 2-234295 |
| Nov. 21, 1990 | [JP] | Japan | 2-314376 |
| Jan. 25, 1991 | [JP] | Japan | 3-25758 |
| May 8, 1991 | [JP] | Japan | 3-132025 |

[51] Int. Cl.⁵ ............................................. H01M 10/40
[52] U.S. Cl. ..................................... 429/194; 429/218
[58] Field of Search .................... 429/194, 196, 218; 423/448, 445

[56] References Cited

U.S. PATENT DOCUMENTS

| 4,615,959 | 10/1986 | Hayashi et al. | 429/194 |
| 4,668,595 | 5/1987 | Yoshino et al. | 429/194 |

FOREIGN PATENT DOCUMENTS

| 201038 | 11/1986 | European Pat. Off. |
| 239410 | 9/1987 | European Pat. Off. |
| 249331 | 12/1987 | European Pat. Off. |

Primary Examiner—Anthony Skapars
Attorney, Agent, or Firm—Oblon, Spivak, McClelland, Maier & Neustadt

[57] ABSTRACT

A nonaqueous electrolyte secondary battery includes a positive electrode of vanadium pentoxide, a negative electrode of lithium-doped carbonaceous material, and an organic electrolyte liquid containing a lithium salt. The electric capacities of the positive and negative materials are selected such that the electric capacity of the carbonaceous material at a potential of 1 volt or lower vs. lithium counter electrode is 0.8 to 1.8 times the electric capacity of vanadium pentoxide at a potential of 2.5 volts or higher vs. lithium counter electrode. Graphitized mesophase microspheres resulting from carbonization of pitch is preferred carbonaceous material. The battery is improved in both charge/discharge cycle and overdischarge properties.

6 Claims, 1 Drawing Sheet

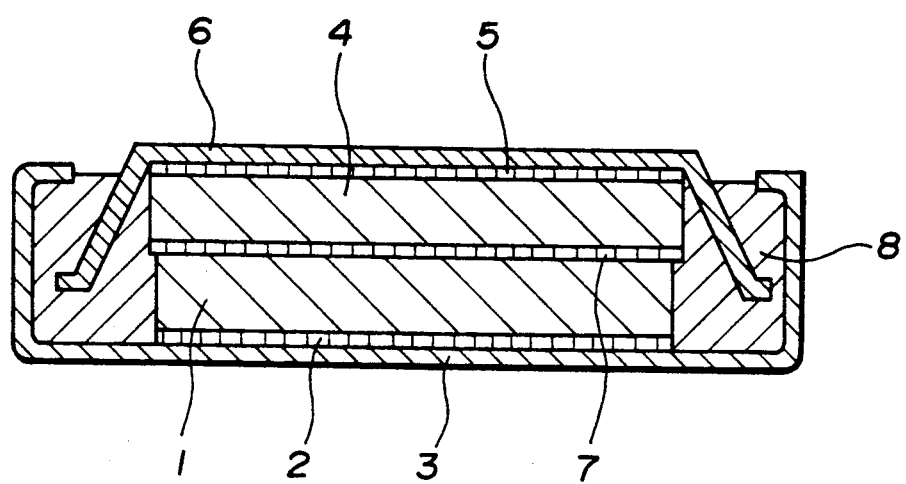

NONAQUEOUS ELECTROLYTE SECONDARY BATTERY

This invention relates to a nonaqueous electrolyte secondary battery, and more particularly, to a stable and reliable nonaqueous electrolyte secondary battery having a high voltage output and improved charge/discharge cycle and overdischarge properties.

BACKGROUND OF THE INVENTION

For prior art nonaqueous electrolyte batteries using light alkali metals such as lithium and sodium as the negative electrode active material, it was proposed to use metal oxides, halides, sulfides or the like as the positive electrode active material. As to primary batteries, those using manganese dioxide and carbon fluoride as the positive electrode active material have been commercially produced and marketed. As to secondary or rechargeable batteries, some lithium secondary batteries have also been commercially produced. These lithium secondary batteries used positive electrode active materials capable of intercalating and deintercalating lithium ions and exhibiting excellent cycle property, for example, titanium and molybdenum sulfides, vanadium oxides, and organic conductive polymers such as polyaniline while alloys of lithium with an alloying element such as aluminum were used as the negative electrode active material. The use of lithium alloys could significantly restrain the occurrence of shortcircuit due to dendrite growth as compared with a negative electrode formed solely of metallic lithium.

Under these circumstances, vanadium pentoxide is considered a promising positive electrode active material for nonaqueous electrolyte batteries in view of its relatively high voltage, chemical stability, and relatively good cycle performance. There is a strong desire to apply vanadium pentoxide to secondary batteries.

However, many problems are encountered by nonaqueous electrolyte batteries using vanadium pentoxide as the positive electrode active material. For example, vanadium pentoxide shows a characteristic undesirable discharge behavior that as charge/discharge cycles are repeated to and from 2 volts via flat regions of about 2.4 and about 3.3 volts at which it electro-chemically reacts with about 1 mol of lithium atom, its grain structure is gradually destroyed, resulting in a considerable loss of discharge capacity. One prior art attempt for overcoming such drawbacks of vanadium pentoxide is to quench molten vanadium pentoxide into amorphous form (see, for example, Solid State Ionics, 9 and 10, 649–657 (1983)). The use of amorphous vanadium pentoxide as positive electrodes is, however, generally accompanied by a lowering of discharge voltage and the advantageous feature of high voltage is lost.

Secondary batteries having a positive electrode of vanadium pentoxide might be fabricated by combining a lithium negative electrode with the vanadium pentoxide so as to take advantage of the first stage flat portion of more than about 2.5 volts of the latter. There would be obtained a secondary battery having a discharge capacity of about 150 mAH/g. The secondary batteries thus constructed, when subject to charge/discharge cycles between 3.8 V and 2.5 V, provide a capacity of 80 to 90% of the initial capacity after the second cycle of later and gradually lowers their discharge voltage. More particularly, the vanadium pentoxide positive electrode converts into a material represented by $Li_xV_2O_5$ during discharge by intercalating lithium ions interlaminarly. It can take up at most 1 mol of lithium ion per mol of $V_2O_5$ at potentials of 3.8 to 2.5 V. During charging, the reaction of releasing lithium ions is induced. The lithium ions, once intercalated, cannot be deintercalated entirely from the vanadium pentoxide with about 10 to 20% of lithium ions left therein. This, combined with increased diffusion resistance within the vanadium pentoxide layer, results in a lowering of discharge voltage. Also the cycle performance is limited to about 100 cycles. For these drawbacks, the vanadium-lithium batteries are inferior in performance to the mainstream batteries as typified by nickel-cadmium batteries.

Regardless of its potential ability as a positive electrode active material as mentioned above, vanadium pentoxide has not been implemented as secondary batteries having high voltage and acceptable charge/discharge properties including cycle performance. There is a need for further research.

There is an increasing demand for secondary batteries while they are used in diversified environments. Under such situations, secondary batteries are quite often subject to overdischarge. Accordingly, recovery from overdischarge is one of most important features of secondary batteries. Where a battery is used as a memory backup power supply in computers, for example, discharge over its rated capacity is often imposed on the battery due to circuitry requirements and such a situation can continue for some time. If the battery cannot recover to its normal charge/discharge from such a heavy duty state, it is undesirably deficient for the memory backup use. Differently stated, the overdischarge property is one of important factors in selecting a battery for such use.

Nevertheless, secondary batteries using vanadium pentoxide as the positive electrode have not reached a satisfactory level with regard to the overcharge property. As described above, secondary batteries having a vanadium pentoxide positive electrode often use a negative electrode of metallic lithium or lithium alloy. For extended cycle life, the negative electrode generally has an electric capacity at least twice the electric capacity of a positive electrode. However, an increased electric capacity of the negative electrode allows the structural change of the positive electrode-forming vanadium pentoxide to proceed during overdischarge to such an irreversible extent that it is difficult to restore the capacity by re-charging.

More particularly, vanadium pentoxide has flat regions at 3.3 V and 2.4 V on discharge where substantial reaction takes place as previously described. It also has regions at 1.5 V and 1 V where considerable reaction takes place. The vanadium pentoxide that has experienced reaction past the regions of 1.5 V and 1 V has a grain structure completely different from the initial one so that a substantially reduced discharge capacity is available after re-charging. Optimum discharge property might be obtained by reducing the amount of metallic lithium used as the negative electrode or reducing the content of lithium in the lithium alloy used as the negative electrode, but at the expense of cycle performance. Then high current discharge is obtained no longer.

Not only the problem of discharge and cycle properties, but also the problem of overdischarge property are outstanding problems associated with vanadium pentoxide batteries. There is a desire for development of a nonaqueous electrolyte secondary battery using a vanadium pentoxide positive electrode by overcoming these ambivalent problems at the same time.

Therefore, an object of the present invention is to provide a nonaqueous electrolyte secondary battery of stable and reliable performance using vanadium pentoxide as the positive electrode active material, which battery has a high voltage output and improved charge/discharge cycle and overdischarge properties.

SUMMARY OF THE INVENTION

In connection with a nonaqueous electrolyte secondary battery using vanadium pentoxide as the positive electrode active material, we have found that by using a lithium-doped carbonaceous material as the negative electrode active material and selecting the materials such that the carbonaceous material or negative electrode has an electric capacity at a potential of 1 volt or lower as measured relative to a lithium counter electrode which is 0.8 to 1.8 times the electric capacity that vanadium pentoxide or positive electrode has at a potential of 2.5 volts or higher as measured relative to a lithium counter electrode, there is obtained a secondary battery which produces a high voltage output and has solved the contradictory problems of improved charge/discharge cycle property and improved overdischarge property. As opposed to the use of lithium alloy as the negative electrode, the carbonaceous material used as a lithium carrier or a material carrying lithium in the negative electrode is effective for minimizing the amount of lithium which is inactivated in response to charge/discharge and fully restraining dendrite growth so that lithium ions are maintained in well reversible state. Since this battery system requires the negative electrode to have only an electric capacity approximately equal to the electric capacity of the positive electrode, a secondary battery having a high voltage output and improved charge/discharge cycle property can be designed without a loss of overdischarge property.

According to the present invention, there is provided a nonaqueous electrolyte secondary battery comprising a positive electrode of vanadium pentoxide, a negative electrode of lithium-doped carbonaceous material, and an organic electrolyte liquid containing a lithium salt. The carbonaceous material forming the negative electrode has an electric capacity at a potential of 1 volt or lower as measured relative to a lithium counter electrode. The vanadium pentoxide forming the positive electrode has an electric capacity at a potential of 2.5 volts or higher as measured relative to a lithium counter electrode. The electric capacity of the carbonaceous material is 0.8 to 1.8 times the electric capacity of the vanadium pentoxide.

BRIEF DESCRIPTION OF THE DRAWING

FIG. 1 is a schematic cross section of a battery according to one embodiment of the present invention.

DETAILED DESCRIPTION OF THE INVENTION

Briefly stated, the nonaqueous electrolyte secondary battery according to the present invention uses vanadium pentoxide as the positive electrode active material and a lithium-doped carbonaceous material as the negative electrode active material. The carbonaceous material as the negative electrode active material may be selected from various carbonaceous materials capable of intercalating and deintercalating lithium ions, for example, coke materials such as pitch coke and needle coke, graphite materials such as natural graphite and artificial graphite, and various carbon fibers such as PAN (polyacrylonitrile). Preferred is graphitized carbon in the form of mesophase microspheres resulting from carbonization of pitch, especially mesophase microspheres with a grain structure having a spacing between (002) planes of up to 3.45 Å and a crystallite thickness of at least 300 Å in the direction of c axis. As for the mechanism of carbonaceous material carrying lithium, it is believed that lithium atoms are intercalated between crystalline layers composed of carbon atoms. Graphitized mesophase carbon is of spherical shape presenting over a wider area active sites at which lithium can be inserted or released, thus providing a high discharge capacity and minimizing the lowering of the capacity with charge/discharge cycles.

Mesophase carbon obtained from petroleum and coal pitches has a uniform spherical shape having a mean particle size of 5 to 15 $\mu$m. Mesophase carbon is blended with a binder to form a mix of almost closest packed structure due to the spherical shape. This mix has a very high density. For example, unlike conventional carbon materials having a maximum density of 1.5 g/cm$^3$, the mesophase carbon has a density as high as 1.8 g/cm$^3$ for the above-mentioned reason. By subjecting mesophase carbon to graphitization, carbon atoms are arranged in layers in a latitude direction of the sphere, resulting in a layered structure having the interlayer spaces exposed over the entire surface of the sphere, allowing lithium to enter the structure from any directions. As opposed to cokes and similar materials having anisotropy allowing entry of lithium in a certain limited direction, the graphitized mesophase carbon presents active sites capable of taking in and out lithium over a wider area, that is, provides an increased lithium occlusion capacity, thus accomplishing improved high current discharge property. Moreover, carbonaceous materials are conventionally improved by firing at temperatures of higher than 1,500° C. This graphitization will result in increased interlayer lithium occlusion ability, a decreased lithium release potential, and an increased battery voltage therewith. Among others, mesophase microspheres are very prone to graphitization. Graphitized mesophase carbon has a lithium occlusion capacity of 300 mAH/g or higher and a lithium release potential of 0.3 volts or lower relative to the redox potential of lithium, suggesting its effectiveness as the negative electrode material of nonaqueous electrolyte secondary battery.

Since the properties of carbonaceous material are largely dictated by the grain interlayer structure and crystallite form, a narrow interlayer spacing and a larger crystallite size are preferred as the negative electrode material. In particular, graphitized mesophase micro-spheres having a spacing between (002) planes of up to 3.45 Å and a crystallite thickness of at least 300 Å in the direction of c axis is an effective negative electrode material for nonaqueous electrolyte secondary batteries because it has a lithium occlusion capacity of 300 mAH/g or higher and a lithium release potential of about 0.2 volt relative to the lithium redox potential.

According to the present invention, the negative electrode is formed of a lithium-doped carbonaceous material, preferably obtained by doping graphitized mesophase microspheres with lithium. There is obtained a nonaqueous electrolyte secondary cell which has a high output voltage and increased discharge capacity and is safe against shortcircuiting.

The mesophase microspheres are obtained from a carbonization step of pitch. For example, pitch originating from petroleum or coal is heat treated at a temperature of 400° to 450° C. for 1 to 2 hours and isolated with pyridine or quinoline. The mesophase microspheres are then graphitized, preferably by firing at a temperature of 1,500° to 3,000° C., especially 2,000° to 2,500° C. for about 5 to 50 hours. An inert gas atmosphere is preferably used for firing.

The negative electrode is prepared from the lithium-doped carbonaceous material in a conventional manner, for example, by adding conductive aids such as graphite and acetylene black and a binder such as fluoro resin powder to the carbonaceous material powder, kneading the mixture with the aid of organic solvent or water, and rolling the mixture. The carbonaceous material powder preferably has a mean particle size of 1 to 20 $\mu$m, especially 5 to 15 $\mu$m although the particle size is not critical. Often, 3 to 25 parts, especially 5 to 15 parts by weight of the conductive aids and 5 to 15 parts by weight of the binder are used per 100 parts by weight of the carbonaceous material powder.

The negative electrode is used in a battery with the carbonaceous material as an active material being doped with lithium. Any desired means may be employed for doping the carbonaceous material with lithium, for example, by placing a working electrode formed of a negative electrode mix comprising the carbonaceous material and a counter electrode of metallic lithium in a nonaqueous electrolyte solution containing lithium ions, whereby the graphitized carbon material in the mix electrode is electrochemically doped with lithium. Alternative method is in-situ doping by placing a negative electrode mix in pressure contact with metallic lithium, and assembling a battery together with a positive electrode and a nonaqueous electrolyte solution, whereby the mix is doped with lithium from the metallic lithium in the battery.

According to the present invention, the negative and positive electrode active materials are selected such that the carbonaceous material of negative electrode has an electric capacity at a potential of 1 volt or lower as measured relative to a lithium counter electrode which is 0.8 to 1.8 times the electric capacity that the vanadium pentoxide of positive electrode has at a potential of 2.5 volts or higher as measured relative to a lithium counter electrode. If the electric capacity of the negative electrode is less than 0.8 times that of the positive electrode, there is obtained an apparently negative electrode capacity limiting battery. Such a too low electric capacity provides good overdischarge property, but a low utilization of the positive electrode, resulting in a low battery capacity. If the negative electrode capacity is too high, the vanadium pentoxide of the positive electrode changes its structure in an irreversible direction and the battery capacity becomes low. The positive and negative electrode electric capacities may be determined by measuring the discharge behavior of the respective electrode materials, using a lithium counter electrode, at a current density of 0.3 to 0.7 mA/cm$^2$ over the above-mentioned voltage range, that is, at least 2.5 V for the positive electrode and up to 1 V for the negative electrode.

Used in the nonaqueous electrolyte secondary battery of the present invention are nonaqueous electrolytes containing lithium ions, for example, lithium salts such as LiClO$_4$, LiBF$_4$, LiPF$_6$, LiCF$_3$SO$_3$, and LiAsF$_6$ and mixtures thereof. These electrolytes are generally used as a solution in a suitable solvent in an amount of 1 to 6 mol/liter. The solvent used herein is not particularly limited, but preferred examples include propylene carbonate, tetrahydrofuran, ethylene carbonate, diethyl carbonate, dimethoxyethane, $\lambda$-butyrolactone, dioxolan, acetonitrile, butylene carbonate, and dimethylformamide, and mixtures of two or more of them. Also included herein are organic solid electrolytes which are obtained by impregnating such polymers as polyethylene oxide, polypropylene oxide, and a phosphazene polymer having an ethylene oxide oligomer side chain with the above-mentioned electrolyte compounds; and inorganic solid electrolytes, for example, inorganic ion conductors such as Li$_3$N and LiBCl$_4$ and lithium glass species such as Li$_4$SiO$_4$ and Li$_3$BO$_3$.

The nonaqueous electrolyte secondary battery of the present invention is preferably constructed by interposing a separator between the positive and negative electrodes in order to prevent the electrodes from contacting each other to cause current shortcircuit. The separator is preferably a porous material which can be impregnated with and allow passage of the electrolyte solution, for example, woven and non-woven fabrics and porous members of synthetic resins such as polytetrafluoroethylene, polypropylene and polyethylene. Preferred are microporous films of polypropylene and polyethylene having a thickness of 20 to 50 $\mu$m. No separator is needed where the solid electrolyte is used.

Remaining components necessary for the battery may be selected from commonly used ones. The battery configuration may be of any desired shapes including coin, button, and paper types as well as cylindrical batteries of spiral structure.

EXAMPLE

Examples of the present invention are given below together with Comparative Examples by way of illustration and not by way of limitation. All parts are by weight.

EXAMPLE 1

To 100 parts of vanadium pentoxide as an active material were added 10 parts of highly conductive fine particle size carbon as a conductive aid and 10 parts of fluoro resin powder as a binder. The mixture was thoroughly blended, further kneaded with the aid of an organic solvent, and then rolled into a sheet form of positive electrode mix having a thickness of about 300 to 900 $\mu$m. Disks of 15 mm in diameter were punched out of the mix sheet and dried at 150° C. The dry disks were ready for use as a positive electrode.

Negative electrodes were obtained by punching disks of the same size as the positive electrode from a metallic lithium foil sheet, integral aluminum foil/lithium foil sheet, integral pitch coke mix/lithium foil sheet, and integral mesophase carbon mix/lithium foil sheet having parameters as reported in Table 2.

The pitch coke mix used for the negative electrode was obtained by adding 100 parts of a fluoro resin powder binder to 100 parts of pitch coke powder (mean particle size 10 $\mu$m), kneading the mixture with the aid of organic solvent, and rolling the mixture into a sheet having a thickness of about 200 to 500 $\mu$m.

Similarly, the mesophase carbon mix for the negative electrode was obtained by adding 100 parts of a fluoro resin powder binder to 100 parts of mesophase carbon powder (mean particle size 8 μm), kneading the mixture with the aid of organic solvent, and rolling the mixture into a sheet having a thickness of about 200 to 500 μm. The mesophase carbon powder was prepared by heat treating a quinoline soluble portion of coal tar pitch at 430° C. for 120 minutes, and separating mesophase microspheres with pyridine. The mesophase microspheres were then fired at a temperature of from 1,000° C. to 2,500° C. for 24 hours in a nitrogen gas atmosphere as reported in Table 1. There were obtained four types of carbonized mesophase microspheres having different grain structures.

The mesophase carbon mix sheet was examined by X-ray diffractometry to analyze a diffraction peak in (002) plane of carbonized mesophase microspheres, thereby determining the spacing between (002) planes and the crystallite thickness in a c axis direction. The results are shown in Table 1. The X-ray diffractometry used to determine the (002) plane spacing and c axis crystallite thickness included the following conditions.

X-RAY DIFFRACTOMETRY PARAMETERS

Target: Cu
Voltage and current: 40 kV, 40 mA
Scanning speed: 1 deg/min.

From a diffraction peak of (002) plane appearing in proximity to 25° to 27° (2θ), the (002) plane spacing and c axis crystallite thickness were determined according to the following formulae:

(002) plane spacing: $d_{002} = \lambda/2 \sin\theta$ c axis crystallite thickness: $Lc = 1.84\lambda/\beta \cos\theta$ wherein $\theta$ is a (002) plane diffraction angle, $\beta$ is a half value width of the (002) plane diffraction peak, and $\lambda = 1.524$ Å.

TABLE 1

| Sample No. | Grain structure | | Firing temperature (°C.) | Remarks |
|---|---|---|---|---|
| | (002) plane spacing (Å) | Crystallite thickness (Å) | | |
| MC1 | 3.35 | 29 | 1000 | |
| MC2 | 3.50 | 335 | 1500 | |
| MC3 | 3.38 | 566 | 1900 | Optimum |
| MC4 | 3.37 | 655 | 2500 | Optimum |

The negative electrodes were adjusted such that their electric capacities (at 1 V or lower) had different ratios relative to the electric capacity of the positive electrode (at 2.5 V or higher) as reported in Table 2 under the heading of "Capacity ratio". The capacity ratio was adjusted by changing the thickness of a metallic lithium foil sheet or the thickness of a metallic lithium foil sheet integrated with a mix sheet. Doping of the negative electrode aluminum or mix with lithium was carried out in situ by attaching a metallic lithium foil to the negative electrode member to form a negative electrode, fabricating a battery as will be described below, and effecting doping within the battery.

Thirteen nonaqueous electrolyte secondary batteries of the configuration shown in FIG. 1 were fabricated by using the above-prepared negative and positive electrodes. The electrolyte solution used contained 1 mol of $LiPF_6$ in 1 liter of propylene carbonate/ethylene carbonate (weight ratio 1/1).

Referring to FIG. 1, there is shown a button type battery, which includes a positive electrode 1, a positive electrode current collector of aluminum 2, a negative electrode 4, and a negative electrode current collector 5 between positive and negative electrode casings 3 and 6. The positive electrode 1 and collector 2 are bonded together with a conductive adhesive, and the collector 2 is spot welded to the inner surface of the positive casing 3. The negative electrode 4 is bonded to the collector 5 which is fixedly attached to the inner surface of the negative casing 6. Sandwiched between the positive and negative electrodes 1 and 4 is a separator 7 which is impregnated with the electrolyte solution. The positive and negative casings 3 and 6 are mated through an insulating gasket 8. This battery has a diameter of 20.0 mm and a thickness of 1.6 mm.

The thus fabricated thirteen batteries were subjected to a charge/discharge test at a charge/discharge current flow of 1 mA to examine their charge/discharge cycle and overdischarge properties. The charge/discharge conditions included a discharge terminating voltage of 2.5 V and a charge terminating voltage of 3.8 V for battery Nos. 1 to 3 using a negative electrode solely of metallic lithium and battery Nos. 6 to 13 using a negative electrode of integrated lithium foil and carbon mix sheet; and a discharge terminating voltage of 2.2 V and a charge terminating voltage of 3.5 V for battery Nos. 4 and 5 using a negative electrode of aluminum-lithium alloy. The results are shown in Table 2.

The cycle property was reported by the number of cycles repeated until the capacity retention lowered to 70% relative to the initial capacity. The overdischarge property was determined by holding the battery in a shortcircuit state for one week with the positive and negative terminals connected through a 3 kΩ resistor, and recharging the battery to determine the percent capacity recovery relative to the initial capacity.

TABLE 2

| Sample | Negative electrode type | Negative electrode thickness, μm | Capacity ratio | Cycle property | Overdischarge property |
|---|---|---|---|---|---|
| 1* | Metallic Li | 45 | 0.75 | 15 | 95% |
| 2* | Metallic Li | 90 | 1.5 | 32 | 92% |
| 3* | Metallic Li | 175 | 3.0 | 120 | 60% |
| 4* | Al/Li | 150/110 | 1.5 | 35 | 94% |
| 5* | Al/Li | 250/220 | 3.0 | 140 | 55% |
| 6 | Pitch coke/Li | 490/140 | 1.2 | 220 | 97% |
| 7* | MC4/Li | 170/80 | 0.7 | 200 | 98% |
| 8 | MC4/Li | 270/130 | 1.1 | 280 | 96% |
| 9 | MC1/Li | 350/160 | 1.4 | 210 | 93% |
| 10 | MC2/Li | 350/160 | 1.4 | 230 | 94% |
| 11 | MC3/Li | 350/160 | 1.4 | 290 | 95% |
| 12 | MC4/Li | 350/160 | 1.4 | >300 | 95% |
| 13* | MC4/Li | 500/250 | 2.2 | >300 | 87% |

*comparison

As seen from Table 2, the batteries within the scope of the present invention are improved in both charge/discharge and overdischarge properties. It is difficult to find a compromise between cycle and overdischarge properties insofar as metallic lithium and lithium alloy are used as the negative electrode. The batteries having the lithium content minimized (Nos. 1, 2 and 4) show excellent overdischarge property, but poor cycle property and the batteries having the lithium content increased (Nos. 3 and 5) show excellent cycle property, but poor overdischarge property.

The batteries generally in accordance with the present invention are improved in both charge/discharge and overdischarge properties. Those batteries having a capacity ratio of the negative to positive electrode within the range between 0.8 and 1.8 (Nos. 6 and 8–12) show better properties, and those batteries using mesophase carbon having optimum structure (Nos. 11 and 12) are the best.

There has been described a nonaqueous electrolyte secondary battery having a positive electrode of vanadium pentoxide and a negative electrode formed of a lithium-doped carbonaceous material having a selected electric capacity relative to the electric capacity of the positive electrode. The battery provides a high voltage output and improved charge/discharge cycle property by taking full advantage of vanadium petoxide while it is also successful in improving overdischarge property.

Although some preferred embodiments have been described, many modifications and variations may be made thereto in the light of the above teachings. It is therefore to be understood that within the scope of the appended claims, the invention may be practiced otherwise than as specifically described.

We claim:

1. A nonaqueous electrolyte secondary battery comprising
   a positive electrode of vanadium pentoxide,
   a negative electrode of lithium-doped carbonaceous material wherein said negative electrode is formed of a carbonaceous material in which graphitized carbon in the form of mesophase microspheres resulting from carbonization of pitch is doped with lithium, and
   an organic electrolyte liquid containing a lithium salt,
   wherein said carbonaceous material forming the negative electrode has an electric capacity at a potential of 1 volt or lower as measured relative to a lithium counter electrode and said vanadium pentoxide forming the positive electrode has an electric capacity at a potential of 2.5 volts or higher as measured relative to a lithium counter electrode, the electric capacity of said carbonaceous material being 0.8 to 1.8 times the electric capacity of said vanadium pentoxide.

2. A nonaqueous electrolyte secondary battery comprising
   a positive electrode of vanadium pentoxide,
   a negative electrode of lithium-doped carbonaceous material wherein the negative electrode is formed of a carbonaceous material in which graphitized carbon in the form of mesophase microspheres resulting from carbonization of pitch is doped with lithium, and wherein the mesophase microspheres resulting from carbonization of pitch are structured to have a spacing between (002) planes of up to 3.45 Å and a crystallite thickness of at least 300 Å in the direction of the c axis, and
   an organic electrolyte liquid containing a lithium salt,
   wherein said carbonaceous material forming the negative electrode has an electric capacity at a potential of 1 volt or lower as measured relative to a lithium counter electrode and said vanadium pentoxide forming the positive electrode has an electric capacity at a potential of 2.5 volts or higher as measured relative to a lithium counter electrode, the electric capacity of said carbonaceous material being 0.8 to 1.8 times the electric capacity of said vanadium pentoxide.

3. The battery of claim 1, wherein said mesophase microspheres have a mean particle size of 5–15 μm.

4. The battery of claim 1, wherein said carbonaceous material has a density of at least 1.8 g/cm$^3$.

5. The battery of claim 1, wherein said carbonaceous material has a lithium occlusion capacity of 300 mAH/g or higher and a lithium release potential of 0.3 volts or lower relative to the redox potential of lithium.

6. The battery of claim 5, wherein said carbonaceous material has a lithium release potential of about 0.2.

* * * * *